No. 863,461. PATENTED AUG. 13, 1907.
L. A. SMITHSON.
GRIP FOR POLISHING RODS.
APPLICATION FILED MAR. 30, 1906.
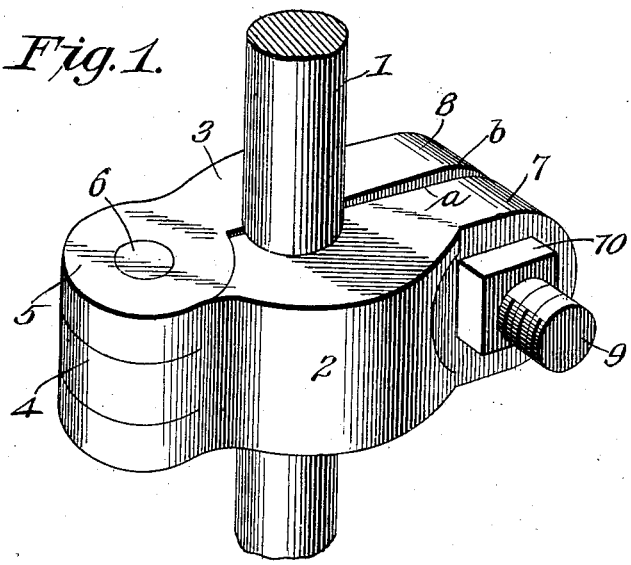
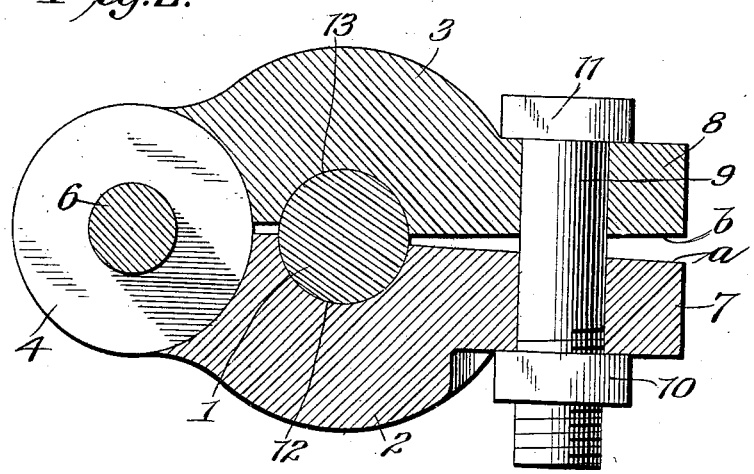
L. A. Smithson, Inventor

UNITED STATES PATENT OFFICE.

LLOYD A. SMITHSON, OF WARREN, INDIANA.

GRIP FOR POLISHING-RODS.

No. 863,461.　　　Specification of Letters Patent.　　　Patented Aug. 13, 1907.

Application filed March 30, 1906. Serial No. 308,934.

*To all whom it may concern:*

Be it known that I, LLOYD A. SMITHSON, a citizen of the United States, residing at Warren, in the county of Huntington and State of Indiana, have invented certain new and useful Improvements in Grips for Polishing-Rods; and I do hereby declare the following to be a full, clear, and exact description of the invention, such as will enable others skilled in the art to which it appertains to make and use the same.
My invention relates to new and useful improvements in grips and more particularly to that class adapted to be used in connection with polishing rods for oil wells.

The object of my invention is to produce a grip of this character which may be used in connection with several sized rods.

A further object is to provide means on said grip whereby the clamping bolt will be prevented from rotating while the nut is being placed thereon Other objects and advantages will be hereinafter referred to and pointed out in the claims.

In the accompanying drawings which are made a part of this application, Figure 1 is a perspective view of my improved clamp applied to a section of a polishing rod, and, Fig. 2 is a central horizontal section therethrough.
Referring to the several parts of my invention in which like numerals designate like parts throughout the drawings, 1 indicates a polishing rod of the usual well known form, to which is secured my improved grip, said grip comprising clamping members 2 and 3, said members being provided at one end with registering hinge sections 4 and 5, respectively, said sections being provided with registering openings through which is inserted a bolt or pin 6. The opposite ends of the members 2 and 3 are elongated and flattened to provide clamping arms 7 and 8 respectively. These arms are provided with registering openings therein, through which is adapted to take a clamping bolt 9, said bolt being provided with a square head at one end and threaded at its opposite end to receive a nut 10.

As best shown in Fig. 2 of the drawing, one face of the head 11 of the bolt abuts against a shoulder formed at the meeting point between the member 3 and the clamping arm 8, whereby the bolt 9 is prevented from turning when the nut 10 is being driven thereon. The meeting faces $a$ and $b$ of the members 2 and 3 are slightly tapered from their junction with the hinge sections 4 and 5 to their outer ends thereby forming a substantially V-shaped space between the faces when they are brought together to clamp the rod, whereby the polish rod can be more securely gripped in the ways 12 and 13 formed in said members 2 and 3. It will therefore be seen that by tapering the meeting faces of the members 2 and 3 and providing the V-shaped space, that different sized rods may be grasped and securely held in the ways 12 and 13 and it will also be seen that by providing the members with tapered faces that the faces of the arms 7 and 8 will not contact when directed towards each other, thereby exerting a stronger grip upon the rod and keeping the arms under tension at all times, while gripping the rod.

What I claim is—

A grip for the purpose described consisting of body members having semi-circular longitudinal ways therein, interlocking hinge members united at one end upon one side of said ways, rigid, unyielding clamping arms at the opposite sides of said ways and having alining openings therein in their ends farthest from the pivot, the outer faces of said arms being parallel and their inner faces tapered to form a V-shaped space extending in unbroken lines from the hinge to the outer ends of said arms, and a bolt passed through said openings and having at one end a head abutting against the adjacent portion of the body member, and a nut adjustable on the other end of said bolt and bearing against the outer face of the other arm.

In testimony whereof I have signed my name to this specification in the presence of two subscribing witnesses.

LLOYD A. SMITHSON.

Witnesses:
　JOSEPH O. KINSTLE,
　LEVI L. SIMONS.